United States Patent [19]

Miller et al.

[11] Patent Number: 5,478,382
[45] Date of Patent: Dec. 26, 1995

[54] COLOR CHANGING COMPOSITIONS FOR USE ON NON-POROUS SURFACES

[75] Inventors: Richard E. Miller, Nazareth, Pa.; Charlene R. Couch, Richmond, Va.

[73] Assignee: Binney & Smith Inc., Easton, Pa.

[21] Appl. No.: 270,998

[22] Filed: Jul. 5, 1994

Related U.S. Application Data

[63] Continuation-in-part of Ser. No. 89,503, Jul. 16, 1993, Pat. No. 5,326,388, which is a continuation-in-part of Ser. No. 923,308, Jul. 31, 1992, Pat. No. 5,232,494, and a continuation-in-part of Ser. No. 78,722, Jun. 16, 1993, Pat. No. 5,352,282, which is a continuation of Ser. No. 923,308, Jul. 31, 1992, Pat. No. 5,232,494.

[51] Int. Cl.$^6$ .................................................. C09D 11/00
[52] U.S. Cl. .................. 106/22 B; 106/23 B; 106/21 A; 106/25 R
[58] Field of Search .......................... 106/22 B, 23 B, 106/21 A, 25 R

[56] References Cited

U.S. PATENT DOCUMENTS

| | | | |
|---|---|---|---|
| 1,550,048 | 8/1925 | Ruben | 346/140 R |
| 2,086,745 | 8/1935 | Sell | 106/22 B |
| 2,305,098 | 7/1940 | Minnear | 106/23 B |
| 2,453,201 | 11/1948 | Cushman | 401/198 |
| 2,555,474 | 7/1948 | deVries | 106/22 H |
| 2,559,608 | 11/1948 | Ehrlich | 106/22 A |
| 2,589,306 | 3/1948 | Steiner | 106/22 A |
| 3,221,361 | 12/1965 | Cline | 401/198 |
| 3,400,003 | 8/1966 | Guertin | 106/22 R |
| 3,617,325 | 6/1969 | Spokes et al. | 427/145 |
| 3,627,546 | 12/1971 | Coppeta | 106/21 A |
| 3,672,842 | 6/1972 | Florin | 106/21 A |
| 3,700,603 | 6/1972 | Rembaum | 106/21 A |
| 3,705,045 | 12/1972 | Nadolski | 106/22 D |
| 3,870,435 | 3/1975 | Watanabe et al. | 427/145 |
| 3,873,185 | 3/1975 | Rogers | 430/4 |
| 3,876,496 | 4/1975 | Lozano | 106/21 A |
| 3,886,083 | 5/1975 | Laxer | 106/21 A |
| 3,941,488 | 3/1976 | Maxwell | 401/17 |
| 3,945,836 | 3/1976 | Miyata | 106/22 R |
| 3,945,837 | 3/1976 | Miyata et al. | 106/22 D |
| 3,952,314 | 4/1976 | Maltz | 346/140 R |
| 3,966,400 | 6/1976 | Birke et al. | 8/82 |
| 3,982,251 | 9/1976 | Hochberg | 106/21 A |
| 3,990,839 | 11/1976 | von der Eltz et al. | 8/14 |
| 4,028,118 | 6/1977 | Nakasuji et al. | 106/21 E |
| 4,070,194 | 1/1978 | Arakawa | 106/21 R |
| 4,071,645 | 1/1978 | Kahn | 106/6 |
| 4,139,965 | 2/1979 | Curry et al. | 427/333 |
| 4,162,164 | 7/1979 | Lin | 106/21 R |
| 4,171,982 | 10/1979 | Lin | 106/21 A |
| 4,176,361 | 11/1979 | Kawada et al. | 106/20 R |
| 4,193,906 | 3/1980 | Hatanaka | 106/23 B |
| 4,212,676 | 7/1980 | Ueda | 106/19 B |
| 4,213,717 | 7/1980 | Lin | 106/22 B |
| 4,227,930 | 10/1980 | Lin | 106/22 B |
| 4,246,033 | 1/1981 | von Wartburg | 106/23 B |
| 4,252,845 | 2/1981 | Griffiths et al. | 106/21 A |
| 4,256,494 | 3/1981 | Yamamoto et al. | 106/22 A |
| 4,322,466 | 3/1982 | Tomlinson | 106/21 R |
| 4,352,691 | 10/1982 | Owatari et al. | 106/22 R |
| 4,413,266 | 11/1983 | Aviram et al. | 106/22 B |
| 4,428,994 | 1/1984 | Rawlins | 427/260 |
| 4,460,727 | 7/1984 | Shoji | 106/23 R |
| 4,490,177 | 12/1984 | Shioi et al. | 106/22 R |
| 4,505,749 | 3/1985 | Kanekiyo et al. | 106/22 R |
| 4,525,215 | 6/1985 | Shioi et al. | 106/22 R |
| 4,525,216 | 6/1985 | Nakanishi | 106/23 B |
| 4,557,618 | 12/1985 | Iwata et al. | 106/20 R |

(List continued on next page.)

FOREIGN PATENT DOCUMENTS

| | | |
|---|---|---|
| 282178 | 2/1988 | European Pat. Off. . |
| 289141 | 3/1988 | European Pat. Off. . |
| 352796 | 7/1989 | European Pat. Off. . |
| 506452 | 3/1992 | European Pat. Off. . |
| 2241653 | 3/1975 | France . |
| 2487372 | 3/1981 | France . |
| 551775 | 6/1932 | Germany . |
| 2724820 | 6/1977 | Germany . |
| 2834459 | 8/1978 | Germany . |
| 2927006 | 7/1979 | Germany . |
| 2927005 | 7/1979 | Germany . |
| 3207217 | 2/1982 | Germany . |
| 59-86672 | 5/1984 | Japan . |
| 59-179572 | 10/1984 | Japan . |
| 62-28834 | 7/1987 | Japan . |
| 1-103676 | 4/1989 | Japan . |
| 3-243673 | 10/1991 | Japan . |
| 1455678 | 1/1975 | United Kingdom . |
| 94/06872 | 9/1993 | WIPO . |

OTHER PUBLICATIONS

Photocopy of the Packaging Material, Binney & Smith, Inc., Easton, Pa. (1992), no month available.
"Hydrogen–Ion Activity to Laminated Materials, Glass", *Kirk–Othmer Encyclopedia of Chemical Technology*, 13 pp. 374–398, 1981 (no month available).
"Color Fibre Pen Inks", BASF Brochure, (1979), no month available.
Miscellaneous Popping Marker Documents, no date available.

*Primary Examiner*—Helene Klemanski
*Attorney, Agent, or Firm*—Leydig, Voit & Mayer, Ltd.

[57] ABSTRACT

A multiple coloring composition system for use on non-porous surfaces is disclosed whose coloring effect is changed upon treatment with a second coloring composition, once the second coloring composition has been deposited over the undercolor coloring composition. The multiple ink system comprises:

(a) an undercolor aqueous coloring composition comprising a film forming resin and an undercolor dye whose coloring ability is destroyed in the presence of a pH of about 10 or greater and/or by a reducing agent; and (b) an overcolor aqueous coloring composition comprising a film forming resin, a colorant capable of maintaining its characteristic color in the presence of a pH of about 10 or greater and/or a reducing agent, a base in an amount sufficient to yield a pH of the overcolor composition of about 10 or greater, and/or a reducing agent.

37 Claims, No Drawings

U.S. PATENT DOCUMENTS

| | | | |
|---|---|---|---|
| 4,578,117 | 3/1986 | Nakanishi | 106/20 A |
| 4,604,139 | 8/1986 | Shioi et al. | 106/23 C |
| 4,620,941 | 11/1986 | Yoshikawa et al. | 252/408.1 |
| 4,681,471 | 7/1987 | Hayduchok et al. | 106/22 B |
| 4,708,817 | 11/1987 | Dudnick | 106/22 B |
| 4,725,316 | 2/1988 | Mahany, II | 106/499 |
| 4,732,614 | 3/1988 | Brooks et al. | 106/23 B |
| 4,744,826 | 5/1988 | Iijima | 106/20 A |
| 4,746,936 | 5/1988 | Takahashi | 346/140 R |
| 4,889,559 | 12/1989 | Goldberg et al. | 106/21 C |
| 4,907,903 | 3/1990 | Kawashima | 106/21 R |
| 4,942,185 | 7/1990 | Inoue et al. | 521/54 |
| 4,954,174 | 9/1990 | Imagawa | 106/27 R |
| 4,954,544 | 9/1990 | Chandaria | 524/111 |
| 4,988,123 | 1/1991 | Lin et al. | 106/23 R |
| 5,004,763 | 4/1991 | Imagawa | 523/161 |
| 5,006,171 | 4/1991 | Mecke et al. | 106/20 A |
| 5,009,536 | 4/1991 | Inoue et al. | 106/20 C |
| 5,017,226 | 5/1991 | Kulisz | 106/21 C |
| 5,043,013 | 8/1991 | Kluger et al. | 106/20 R |
| 5,082,386 | 1/1992 | Hironaka et al. | 401/206 |
| 5,106,881 | 4/1992 | Inoue et al. | 521/54 |
| 5,118,350 | 6/1992 | Prasad | 106/22 R |
| 5,120,359 | 6/1992 | Uzukawa et al. | 106/20 A |
| 5,139,572 | 8/1992 | Kawashima | 106/21 R |
| 5,176,746 | 1/1993 | Nakanishi et al. | 106/25 R |
| 5,196,243 | 3/1993 | Kawashima | 106/21 R |
| 5,203,913 | 4/1993 | Yamamoto et al. | 106/22 B |
| 5,215,956 | 6/1993 | Kawashima | 106/21 R |
| 5,222,823 | 6/1993 | Conforti | 106/22 B |
| 5,232,494 | 8/1993 | Miller | 106/22 B |
| 5,262,535 | 11/1993 | Kaiser | 106/22 B |

COLOR CHANGING COMPOSITIONS FOR USE ON NON-POROUS SURFACES

RELATED APPLICATIONS

This application is a continuation-in-part of previous U.S. patent application Ser. No. 08/089,503 filed Jul. 16, 1993 now U.S. Pat. No. 5,326,388 which was a continuation-in-part of previous U.S. patent application Ser. No. 07/923,308 filed Jul. 7, 1992 which issued as U.S. Pat. No. 5,232,494 on Aug. 3, 1993. This application is also a continuation-in-part of U.S. patent application Ser. No. 08/078,722 filed Jun. 16, 1993 now U.S. Pat. No. 5,352,282 which was a continuation of previous U.S. patent application Ser. No. 07/923,308 Jul. 31, 1992 which issued as U.S. Pat. No. 5,232,494 on Aug. 3, 1993.

FIELD OF THE INVENTION

This invention relates generally to the field of coloring compositions and more particularly to a pair of coloring compositions which may be used in conjunction with each other on non-porous surfaces such as transparencies for use with overhead projectors to enable laying down an initial mark using a first coloring composition yielding a first color and then using an overcolor coloring composition to enable a change of color of a portion or the entirety of the initial mark.

BACKGROUND OF THE INVENTION

In business situations, non-porous surfaces are often used for presentations. Especially, transparent sheets of plastic film are often used in conjunction with overhead projectors to enable a large group of people to visually perceive written information. These transparent sheets are commonly termed transparencies. Useful in marking on such non-porous surfaces are markers and pens containing inks, crayons, and sufficiently soft pencils of various colors. However, it is often difficult to highlight information on such non-porous surfaces as transparencies.

One method of highlighting or identifying especially important information is to indicate the information in a color differing from the color of the general text or image. Changing the color of a mark is not readily done with the coloring instruments such as those described. Generally, highlighting has been accomplished in the past by merely holding over writing or attempting to cover over one color with a second color. When performing such highlighting, the marks produced are often not the desired color or clarity and the tips of the markers get soiled with the other inks, further reducing the effectiveness of the highlighting. Therefore, there has been a long felt need for compositions, including inks, and markers containing such compositions, which produce marks of a first color that can be readily changed into a wide variety of second colors. Especially needed is such a group of compositions which may be used in markers without soiling the nib of the second used marking instrument.

Coloring compositions generally are mixtures of a coloring matter dispersed or dissolved in a carrier fluid. The colorant, if readily dissolving in the carrier fluid, is termed a dye. An insoluble coloring material is termed a pigment. Pigments are finely ground solid materials and the nature and amount of pigment contained in an ink determines its color.

In one available marker application, a child is able to change a specific initial mark laid down to a second specific color by applying a reducing agent to the first mark yielding a change in color. The marker inks used in these markers are typically prepared by blending a reducing agent (sometimes termed a bleaching agent) or pH sensitive dye with a dye that is stable in reducing agent or high pH. For example, German Patent Specification No. 2724820, (hereinafter "the German Patent"), concerns the combining of a chemically stable dye and a chemically unstable dye in an ink formulation. Once a mark using this combination of stable and unstable dyes is laid down, the mark may be overwritten with a clear reducing agent solution, eliminating the color contribution of the unstable dye. The resulting mark of the stable dye, with its characteristic color, remains.

There are several drawbacks to such a marking system. First, there are strict limitations on the number of color changes which may be produced. Specifically, in formulations made according to the German Patent, the particular ink composition may only be changed from a first color to a fixed second color. For example, a green mark may only be changed to a violet color as the inks are described in the practice of the German Patent. In addition, since one of the required pair of markers contains only the reducing agent, that reducing agent marker cannot render a visible mark and may only be used in combination with the base color marker. Once the base color marker is used up, the reducing agent marker is of no use. Or, once the reducing agent marker is used up, the base color marker may only be used for the color which it initially marks with. A further disadvantage of the marking process of the German Patent is that the nib of the reducing agent marker tends to get soiled by picking up the colors of the base coloring composition, thus tainting the color of subsequent marks.

Coloring composition may also optionally include such ingredients as humectants, preservatives, and drying agents. Humectants function to improve freeze/thaw stability and to control drying out of the tip when the coloring composition is used as a marker ink. Preservatives serve the obvious function of preventing spoilage of the ink during the expected shelf life of the marker product. Drying agents speed drying of a mark laid down by a marker.

Therefore, an object of the present invention is to provide a coloring composition system which is capable of enhanced multiple color changing abilities for use on non-porous surfaces.

An additional object of the present invention is to produce a coloring composition system which includes at least two different coloring compositions each of which may be used independently or which may be used in combination to provide color changing ability on non-porous surfaces.

A further object of the present invention is to provide a coloring composition system in the form of inks for use on non-porous surfaces which prevents a nib of a color changing marker from becoming visibly soiled from contacting a base color composition.

These and other objects will become apparent to those skilled in the art to which the invention pertains.

SUMMARY OF THE INVENTION

The present invention overcomes the drawbacks associated with prior overwriting ink compositions in that the particular undercolor coloring composition made according to the invention is suitable for use on non-porous surfaces and may be changed to multiple second colors, depending upon the dye present in the overcolor composition.

Advantageously, an overcolor composition of the present invention makes a visible mark on non-porous surfaces, thus it may be used alone or in combination with an undercolor coloring composition.

An additional advantage of the overcolor composition of the present invention is that, unlike currently used color change markers, the nib of the tip of marker containing the overcolor ink does not become visibly soiled with the undercolor coloring composition color because the undercolor is immediately destroyed upon contact with the overcolor composition.

In general, the present invention is a multiple coloring composition system for use on non-porous surfaces whose coloring effect may be changed upon treatment with an overcolor second coloring composition, once the overcolor has been deposited over the undercolor coloring composition. In one embodiment, the multiple coloring composition system comprises:

(a) an undercolor aqueous coloring composition comprising a first film forming resin and an undercolor dye whose coloring ability is destroyed in the presence of a pH of about 10 or greater and/or in the presence of a reducing agent; and (b) an overcolor aqueous coloring composition comprising a second film forming resin, a colorant capable of maintaining its characteristic color in the presence of a pH of about 10 or greater and/or in the presence of a reducing agent, a base such that the pH of the overcolor composition is about 10 or greater and/or a reducing agent.

Suitable dyes for use in the undercolor coloring composition include polymethine dyes, triphenylmethane dyes, cyanine dyes, methine dyes, and azo dyes which are unstable in the presence of a pH of about 10 or greater and/or are unstable in the presence of a reducing agent. Suitable colorants for use in the overcolor coloring composition include pigments, xanthene dyes, pthalocyanine dyes, and azo dyes which are stable in the presence of a pH of about 10 or greater and/or are stable in the presence of a reducing agent.

Suitable reducing agents for use in compositions of the invention include hydrogen sulfide, sodium sulfite, sodium bisulphite and stannous chloride. Suitable bases for use in compositions of the invention include ammonium hydroxide, sodium hydroxide and sodium carbonate.

Also disclosed is an ink composition system comprising:

(a) an undercolor aqueous ink comprising from about 0.1 to about 5% by weight of the undercolor ink of a first film forming resin and an undercolor dye whose coloring ability is destroyed in the presence of a reducing agent and/or a pH of about 10 or greater in an amount of from about 0.1 to about 15% by weight of the undercolor ink; and (b) an overcolor aqueous ink comprising from about 0.1 to about 5% by weight of the overcolor ink of a second film forming resin, from about 1% to about 20% by weight of said overcolor ink of a reducing agent; from about 0.1% to about 10% by weight of said overcolor ink of a base; and from about 0.1% to about 15% by weight of said overcolor ink of a colorant which maintains its characteristic color in the presence of a reducing agent and/or a pH of about 10 or greater.

A color changing marking system is also disclosed which comprises at least two marking instruments. The undercolor marking instrument contains an undercolor ink composition comprising a film forming resin and a dye whose coloring ability is destroyed in the presence of a reducing agent and/or a pH of about 10 or greater. The overcolor writing instrument contains an overcolor ink comprising a film forming resin, from about 1% to about 20% by weight of reducing agent, from about 0.1% to about 10% by weight of a base, from about 0.1% to about 15% by weight of a colorant which maintains its characteristic color in the presence of a reducing agent and/or a pH of about 10 or greater.

The coloring compositions of the invention may also optionally comprise a humectant, a drying agent, and a preservative.

DETAILED DESCRIPTION OF THE INVENTION

The present invention imparts the desirable ease of application and convenience of use of traditional color changer systems while avoiding the strict limitations of current color change markers. The composition of the present invention therefore imparts improved and convenient coloring properties for use on non-porous surfaces such as transparencies.

In general, the present invention is a multiple coloring composition system for use on non-porous surfaces wherein the color of a mark laid down by an undercolor coloring composition, for example using a marker to dispense the composition, may be overwritten by a variety of second colors upon the application of an overcolor coloring composition over the undercolor coloring composition. An embodiment of this marking system comprises:

(a) an undercolor aqueous coloring composition comprising a film forming resin and an undercolor dye whose coloring ability is destroyed in the presence of a reducing agent and/or a pH of about 10 or greater; and (b) an overcolor aqueous coloring composition (the overcolor) comprising a film forming resin, a colorant capable of maintaining its characteristic color in the presence of a reducing agent and/or a pH of about 10 or greater, and a reducing agent and/or a base in an amount sufficient to yield a pH of about 10 or greater.

To increase the pH of the overcolor aqueous coloring composition, a base in an amount sufficient to elevate the pH of the overcolor aqueous coloring composition to a level of about 10 or greater, and preferably from about 10 to about 12, is preferably used.

In a preferred embodiment, the overcolor aqueous coloring composition comprises both a reducing agent and a base in an amount sufficient to elevate the pH of the overcolor aqueous coloring composition to about 10 or greater and preferably from about 10 to about 12. In this preferred embodiment, the marking system comprises:

(a) an undercolor aqueous coloring composition comprising a film forming resin and an undercolor dye whose coloring ability is destroyed in the presence of a reducing agent and/or in the presence of a pH of about 10 or greater; and (b) an overcolor aqueous coloring composition comprising a film forming resin, from about 1% to about 20% by weight of a reducing agent, a base in an amount sufficient to produce a pH of about 10 or greater, and from about 0.1% to about 15% by weight of a colorant capable of maintaining its characteristic color in the presence of a reducing agent and a pH of about 10 or greater.

An appropriate undercolor dye is generally selected to be used in conjunction with the selected overcolor colorant. Where an undercolor dye is incapable of maintaining its characteristic color when exposed to a pH of about 10 or greater, an overcolor colorant is selected which is capable of maintaining its characteristic color at such a pH and a base is added to the overcolor composition to yield a pH of about 10 or greater. Where an undercolor dye is incapable of maintaining its characteristic color when exposed to a reducing agent, an overcolor colorant is selected which is capable of maintaining its characteristic color in the presence of a reducing agent and a reducing agent is added to the overcolor composition.

Certain undercolor dyes may be selected which are incapable of maintaining their characteristic color when exposed to a combination of a pH of about 10 or greater and a reducing agent. In such a case, an overcolor colorant is selected which is capable of maintaining its characteristic color in the presence of both a pH of about 10 or greater and a reducing agent and both a base and a reducing agent are added to the overcolor composition.

Finally, a collection of multiple undercolor coloring compositions may be assembled, some of which contain a dye incapable of maintaining its characteristic color in the presence of a pH of about 10 or greater and some of which contain a dye incapable of maintaining its characteristic color in the presence of a reducing agent. For economic efficiency, in formulating overcolors for use with such a collection of undercolors, it is preferable to use an overcolor coloring composition which comprises a film forming resin, a colorant capable of maintaining its characteristic color in the presence of both a pH of about 10 or greater and a reducing agent, a base, and a reducing agent. In such a case, the overcolor coloring composition may be used to overwrite a mark made by any of the collection of undercolor coloring compositions without regard to whether the undercolor composition contains a dye which is incapable of maintaining its characteristic color in either the presence of an elevated pH or in the presence of a reducing agent.

Most suitable for use as dyes in the undercolor coloring compositions are dyes that are easily destroyed by reducing agent. Such coloring compositions are commonly known in the field and are occasionally used as chemically "erasable" inks. Also suitable for use as dyes in the undercolor coloring compositions are dyes which are easily destroyed in the presence of a pH of about 10 or greater. Especially suitable for use as dyes in the undercolor coloring composition are polymethine dyes, triphenylmethane dyes, cyanine dyes, methine dyes, and azo dyes which are unstable in the presence of a pH of about 10 or greater and/or are unstable in the presence of a reducing agent. Such dyes include the dyes marketed under the tradenames BASACRYL X-RL YELLOW™ (Basic Yellow 49), marketed by the BASF Corporation, ASTRAZON BLUE FRR™ (Basic Blue 69), ASTRAZON BRILLIANT RED 4G™ (Basic Red 14), and ASTRAZON PINK FBB™ (Basic Red 49) by Miles-(Mobay); and the dyes marketed under the tradenames Acid Green 3 by International Dyestuffs Corporation, Acid Blue 93 and Acid Violet 19 marketed by Spectra Color Corporation as well as mixtures thereof.

The listed ASTRAZON dyes are classified as polymethine dyes. Polymethine dyes are colored substances in which a series of —CH= (methine) groups connect to terminal groups of a chromophore. Polymethine and cyanine are often used interchangeably as generic terms for all polymethine dyes. The previous primary usage for polymethine dyes are dyeing acetate rayon as well as polyacrylnitrile and polyacrylamide. Acid Green 3, Acid Blue 93 and Acid Violet 19 are triphenylmethane dyes. Acid Green 3 is commonly used in making pulp colors or lakes. Acid Violet dyes are primarily fashion colors.

To achieve good coloring of the undercolor coloring composition, the minimum concentration of dye which will produce a workable ink is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. It is also a function of the characteristics of the desired end product, though a practical upper limit in the formulation of, for example, a marker ink, is about 15% by weight. The preferred concentration range for most applications is from about 1% to about 6% dye by weight of the composition. A concentration of about 1.5% to about 4% is even more preferred when the undercolor coloring composition is to be used as an ink for a typical marker to ensure good coloration.

The overcolor coloring composition of the present invention is preferably formulated by combining a reducing agent and a base with a colorant which maintains its characteristic color in the presence of reducing agent and in high pH conditions. Of course, where colorants used in the undercolor composition are only affected by a reducing agent, the base may be deleted. Also, where dyes used in the undercolor composition are only affected by an elevated pH, the reducing agent may be eliminated. However, for maximum commercial application and for maximum effect upon a wider variety of undercolor compositions, the overcolor composition is preferably formulated with a reducing agent and base in combination.

A limited number of dye colorants meet this criteria. Dyes to be used in the overcolor coloring composition must be highly resistant to chemical attack such as from a reducing agent or high pH conditions. Dyes meeting this criteria include xanthene dyes, pthalocyanine dyes, and azo dyes which are stable in the presence of a pH of about 10 or greater and/or are stable in the presence of a reducing agent. Dyes which have been found to meet these criteria include PYRANINE 120™ marketed by Miles(Mobay)(commonly termed Solvent Green 7), Acid Red 52 marketed by Carolina Color, Food Red 14 marketed by Hilton-Davis, BASANTOL GREEN 910™ marketed by BASF (commonly termed Acid Green 26), Acid Red 87 marketed by Hilton-Davis, Acid Red 92 marketed by International Dyestuffs Corporation, Acid Red 388 and Direct Blue 199 marketed by Crompton & Knowles, and mixtures thereof.

Acid Red dyes, classified as xanthene dyes, are generally used as colorants for foods, drugs and cosmetics. Specifically, Acid Red 87, is the disodium salt of 2,4,5,7-tetrabromo-9-o-carboxyphenyl-6-hydroxy-3-isoxanthone. Acid Red 87 is also called D & C Red No. 22 by the Food and Drug Administration ("FDA"), and sold under the tradenames Eosine YS and Eosine G. In addition, Acid Red 92, the disodium salt of 2,4,5,7-tetrabromo-9-3,4,5,6-tetrachloro-o-carboxylphenyl)-6-hydroxy-3-isoxanthone, is called D & C Red No. 28 by the FDA, and sold under the tradename Phloxine B™. Acid Red 52 is a colorant for plastics. Further, Food Red 14 or FD&C Red No. 3, commercially available under the tradenames ERYTHROSINE™ and ERYTHROSINE BLUISH™, is the disodium salt of 9(o-carboxyphenyl)-6-hydroxy-2,4,5,7-tetraiodo-3H-xanthen-3-one, which contains smaller amounts of lower iodinated fluoresceins.

To achieve good coloring of the overcolor coloring composition, the minimum concentration of dye which will produce a workable ink is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. It is also a function of the characteristics of the desired end product, though a practical upper limit in the formulation of, for example, a marker ink, is about 15% by weight. The preferred concentration range for most applications is from about 1% to about 6% dye by weight of the composition. A concentration of about 1.5% to about 4% is even more preferred when the overcolor coloring composition is to be used as an ink for a typical marker to ensure good coloration.

Also newly discovered is that pigments may be used as an excellent colorant in overcolor coloring compositions of the invention. To achieve good coloring of the overcolor coloring composition and promote compatibility with the remaining ink components, the pigment is utilized in the form of an aqueous dispersion, inasmuch as pigments are by definition insoluble materials. Pigment dispersions are commercially available which are combinations of a pigment, an aqueous based chacacter, and a surfactant or dispersant system. A pigment dispersion may also be prepared specifically for use in the overcolor coloring composition of the invention. From the standpoint of convenience, a commercial pigment dispersion is preferred for use in the present invention. Typical commercial dispersions contain 30 to 74% by weight active pigment ingredients.

In general, a workable pigment dispersion may have a wide or narrow particle size range depending upon the use to which the ink will be put. The lower limit on pigment particle size is determined not by any functional characteristic of the overcolor coloring composition, but by the ability to form a stable dispersion. Similarly, the upper limit on pigment particle size is determined by the type of applicator by which the overcolor coloring composition is to be applied or dispensed, since pigment particle size determines the ability of pigment particles to flow through, for example, the matrix of a marker nib where the overcolor coloring composition is in the form of an ink.

Indeed, relatively larger pigment particles can restrict ink flow through many types of nibs commonly utilized in writing and marking instruments, ultimately rendering them inoperable. Larger particle sizes may, however, may be used where the overcolor coloring composition is to be used in, for example, a paint marker, in which the composition is dispensed through a valve assembly, or in a roller ball pen or where the composition is used in the form of a paint and a brush is used to distribute the overcolor coloring composition. Pigments having a mean particle size range from about 0.05 to about 2.0 microns have been found to work well in compositions of the invention.

In choosing the most suitable pigment particle size when coloring compositions of the invention are to be used in the form of, for instance, an ink, one must be guided by the particular nib type to be utilized in the writing or marking instrument in which the ink will be placed. Of course, a pigment particle size must be selected which will allow the passage of the composition through the nib being used. Further, the pigment particle size should be selected to promote capillary flow through the particular nib being used in the writing or marking instrument. In general, the size of pigment particles should be kept as low as possible while maintaining the stability of the composition. For example, it has been found that for an ink to be utilized in a marking instrument having either a porous plastic nib or a bonded fiber nib, an ultra fine pigment dispersion having a mean particle size in the range of from about 0.05 to about 0.5 microns provides acceptable results. A more preferred ultra fine pigment dispersion for such applications has a mean particle size in the range from about 0.05 to about 0.25 microns, since such a dispersion promotes better wicking or capillary flow through the nib. Examples of suitable pigment dispersions, which are especially suited for compositions of the invention used in the form of an ink include HOSTAFINE RUBINE F6B™ (C.I. Pigment Red 184 dispersion), BLUE B2G™ (Pigment Blue 15-3) and Black 7 (Pigment Black T), marketed by Hoescht Celanese Corporation under the tradename "HOSTAFINES DISPERSIONS"™.

The minimum concentration of pigment which will produce a workable overcolor coloring composition is governed by the color intensity desired, though as little as 0.1% active pigment may be sufficient for certain applications. The maximum workable concentration of pigment is determined largely by the ability to maintain a stable composition, and can vary widely depending upon the concentration of other components. The maximum concentration of pigment usable is also a function of the characteristics of the desired end product, though a practical upper limit in the formulation of the overcolor coloring composition used, for example, as a marker ink, is about 30% by weight since higher concentrations may cause ink instability and undesirably high viscosity.

When a commercial pigment dispersion is utilized, as it preferably is, a practical limit is imposed by the concentration of pigment in the dispersion, which, as previously noted, is typically in the range of about 30% to 74% pigment by the weight of dispersion. The preferred concentration range for most applications is from about 1% to about 10% active pigment by weight of the composition. A concentration of about 3% by weight of active pigment is ordinarily required to ensure good coloration in a typical marker ink and most preferred is a concentration of active pigment in a concentration range of about 1.5% to about 5% by weight of the composition.

Typical reducing agents for use in the overcolor coloring composition of the invention include hydrogen sulfide, sodium sulfite, sodium bisulphite and stannous chloride. Certain limited bleaches which act as weak oxidizing agents such as sodium hypochlorite and hydrogen peroxide may also operate to effect a color change. Hydrogen peroxide is also known to sometimes operate as a weak reducing agent. The preferred reducing agent for use in the overcolor coloring composition of the invention is $Na_2SO_3$ (sodium sulfite). Reducing agent is generally present in the overcolor coloring composition of the invention in an amount from about 1% to about 20% by weight with a minimal amount required to allow for the elimination of the undercolor coloring composition of the invention and the maximum amount determined by (1) the stability of the composition, (2) the need to avoid excessive crystal growth in the overcolor coloring composition which would impart a light scattering effect where the composition is used on a transparency for use with an overhead projector to achieve a projected image, and (3) the safety of the composition for use by children. Preferably, the reducing agent is contained in the overcolor coloring composition in an amount of from about 5% to about 10%, and most preferably in an amount of from about 8% to about 10% by weight of the overcolor coloring composition.

Overcolor coloring compositions of the invention may be formulated using only a reducing agent. However, the reducing agents used in overcolor coloring compositions of the invention perform most effectively in the presence of an elevated pH. To elevate the pH of the overcolor coloring composition, a base is added. Bases which may be used in the overcolor coloring composition of the invention are typically strong bases, usually having a pH of from about 10 to about 12. Typical bases which may be employed in the overcolor coloring composition of the invention include ammonium hydroxide, sodium hydroxide, and sodium carbonate. The preferred base is sodium hydroxide.

The base is generally present in the overcolor coloring composition of the invention in an amount from about 0.1% to about 10% by weight. Preferably, the base is added in an amount sufficient to raise the pH of the composition to a pH of from about 10 to about 12. Preferably, the base is contained in the overcolor coloring composition in an amount of from about 0.5% to about 8%, and most preferably from about 1% to about 5% by weight of the overcolor coloring composition.

The water used in the undercolor coloring composition and the overcolor coloring composition of the present invention is preferably deionized water. The amount of water present in undercolor coloring compositions is typically from about 10% to about 90% by weight of the composition and this amount is in large part determined by the desired end use of the undercolor coloring composition, for instance, as an ink or a paint, and the amount of other components included in the undercolor color composition. To achieve a desirable viscosity when the undercolor coloring composition is used in the form of, for example, an ink, water is preferably present in an amount of from about 20% to about 85%, and most preferably from about 60% to about 85% by weight of the composition.

The amount of water present in the overcolor coloring composition of the invention is also governed in large part by the desired end use of the composition, for instance, as an ink or a paint, and the amount of other components included in the undercolor coloring composition. The amount of water present in overcolor coloring compositions is typically from about 10% to about 90% by weight of the composition. To achieve a desirable viscosity when the overcolor coloring composition is used in the form of, for example, an ink, water is preferably present in an amount of from about 20% to about 85%, and most preferably from about 60% to about 85% by weight of the composition.

The undercolor coloring composition further comprises a film forming resin. This resin is to promote adherence of marks made using the undercolor and overcolor coloring composition on non-porous surfaces such as transparencies. Further, the film forming resin is important to prevent dye used as colorant in the undercolor coloring composition from crystallizing out of solution and losing color value. It is important that a film forming resin be selected in which the dye used as colorant in the undercolor coloring composition is soluble.

Suitable film forming resins include polyvinylpyrrolidones marketed under the tradename of PVPK™ by Industrial Specialty Products, polyvinyl alcohol (PVOH) marketed under the tradename of AIRVOL™ by Air Products, polyethylene glycol marketed under the tradename of POLYOX™ by Union Carbide, alkali soluble acrylics such as those marketed under the tradename ACRYSOL WS-24™ by Rohm & Haas Co., and modified starches such as those marketed under the tradename DRYSWEET 42™ by American Maize.

A resin having a compatible molecular weight must be chosen based upon the planned end use for the undercolor coloring composition. Where the undercolor coloring composition is to be used in the form of an ink for instance, a polyvinylpyrrolidone such as PVPK-15 or -30 is appropriate while PVPK-60 and -90 cause high viscosities which render the coloring composition too thick for dispensing through common marker nibs. A resin having too low of a molecular weight may provide insufficient binding properties to the composition and result in a coloring composition which flakes off of non-porous surfaces. PVPK-30 is the most preferred film forming resin and its manufacturer claims a viscometric molecular weight of approximately 40,000. Where an AIRVOL film forming resin is used, AIRVOL 523 is preferred. AIRVOL 523 has an 87–89% degree of hydrolysis and a number average molecular weight range of 44,000 to 65,000. Where a POLYOX film forming resin is used, POLYOX WSR-N-10 is preferred and its manufacturer claims a molecular weight of 100,000.

The amount of film forming resin present in the undercolor coloring composition of the invention is governed in part by the film forming resin used and the amount of other components included in the undercolor coloring composition. A sufficient amount of film forming resin must be added to promote adhesion of the undercolor coloring composition to non-porous surfaces. Film forming resin is generally present in the undercolor coloring composition of the invention in an amount from about 0.1% to about 5% with a minimal amount required to allow for promoting adhesion of the undercolor coloring composition of the invention to non-porous surfaces and the maximum amount determined by the viscosity of the resulting undercolor coloring composition, the stability of the undercolor coloring composition and the cost effective limit of using the film forming resin. Preferably, the film forming resin is present in undercolor coloring compositions of the invention in an amount of from about 1% to about 3% by weight of the undercolor coloring composition.

The overcolor coloring composition also further comprises a film forming resin. Again, this resin is to promote adherence of marks made using the overcolor coloring composition on non-porous surfaces such as transparencies. Further, the film forming resin is important to prevent dye used as colorant in the overcolor coloring composition from crystallizing out of solution and losing color value. It is important that a film forming resin be selected in which the dye used as colorant in the overcolor coloring composition is soluble.

Suitable film forming resins for use in the overcolor coloring compositions of the invention include the same film forming resins suitable for use in the undercolor coloring compositions of the invention. The amount of film forming resin present in the overcolor coloring composition of the invention is governed in part by the film forming resin used and the amount of other components included in the overcolor coloring composition. A sufficient amount of film forming resin must be added to promote adhesion of the overcolor coloring composition to non-porous surfaces. Film forming resin is generally present in the overcolor coloring composition of the invention in an amount from about 0.1% to about 5% with a minimal amount required to allow for promoting adhesion of the overcolor coloring composition of the invention to non-porous surfaces and the maximum amount determined by the viscosity of the resulting overcolor coloring composition, the stability of the overcolor coloring composition and the cost effective limit of using the film forming resin. Preferably, the film forming resin is present in overcolor coloring compositions of the invention in an amount of from about 1% to about 3% by weight of the overcolor coloring composition.

Optionally, both the undercolor coloring composition and the overcolor coloring composition may further comprise such additives as humectants, drying agents and preservatives such as biocides and fungicides.

Addition of a humectant ensures that coloring compositions of the invention, when in the form of an ink, do not prematurely dry in a capillary marking system, such as a bonded fiber marking nib. Typical humectants which may be employed in the coloring compositions of the present invention include polyhydric alcohols such as ethylene glycol, propylene glycol, hexylene glycol and poly(ethylene glycol), and hydroxylated starches. The humectant is preferably propylene glycol or glycerin.

The humectant is generally used in an amount of from about 0% to about 30% by weight of the composition, though this range is by no means critical. The amount of humectant to be added is determined by the type of nib used in the writing or marking instrument to be employed and the protection time period desired. In one preferred composition, the humectant, propylene glycol, is added in an amount of from about 5% to about 15% by weight of the coloring composition.

To achieve a more rapid drying rate and to improve marking characteristics upon non-porous materials, a drying agent may be added to increase the overall volatility and therefore the evaporation rate of the water and the pH regulant. Any compatible material which performs this function may be used.

The drying agent preferably should be a volatile polar material so as to ensure compatibility with the primary components of the marker ink. Straight chain C2–C4 alcohols are good, highly volatile drying agents, and of these, ethanol is preferred because of its relatively low cost and because it does not contribute any unpleasant odor to the composition. Alcohols can also provide added benefits, such as reducing surface tension, increasing adherence of the ink to porous surfaces, and providing bactericidal activity when added to the ink composition.

To discourage improper usage of the marker ink, such as ingesting the ink, the alcohol may contain a bittering agent or a conventional denaturant. An alcohol utilizing a bittering agent will discourage such improper usage of the ink by simply imparting a disagreeable taste, while not requiring the use of toxic denaturants as methanol or benzene, and is therefore preferred. A conventional denatured alcohol may, of course, also be utilized. The most preferred drying agent is an ethyl alcohol which contains a bittering agent and which is sold under the trade name SDA 40B™, manufactured by Aaper Alcohol.

When utilized, the drying agent preferably is added from about 5% up to about 30% by weight, with the most preferred concentration being about 8–10% by weight, though these amounts are not critical to the practice of the invention. About 8% per weight of drying agent is ordinarily required to ensure rapid drying of the ink on a non-porous surface, while amounts in excess of about 30% by weight may adversely affect stability of the ink and may cause flocculation of the pigment unless other stabilizing additives are employed.

To maintain the shelf life of the composition, a preservative may be added. The preservative preferably serves as both a bactericide and a fungicide, and is added in any effective amount, though a typical concentration range is from about 0.1% up to about 5.0% by weight. The use of preservatives in levels greater than about 5% by weight may cause the ink to become toxic or unstable and may, in any event, be unnecessary. Should alcohol be added to the composition as a drying agent, that alcohol will function as a preservative to some extent also.

Any conventional preservative may be utilized in the invention as long as there is compatibility with the remaining ink components. For example, preservatives manufactured by Hals Corp., and sold under the tradename NUOSEPT 95™ Bicyclic-oxozolidine, by Dow Chemical Co. and sold under the trademarks DOWICIL 75™ (1-(3-chloroallyl)-3,5,7-triaza-1-azoniaadamantane chloride) and DOWICIL 200™ (3-chlorovinyl-hexamethylene tetrammonium chloride) or a preservative manufactured by Rohm and Haas and sold under the trademark KATHON PFM® (isothiazolinones), or a preservative manufactured by Sutton Labs and sold under the trademark GERMALL II™ (imazolidinyl urea), or a preservative manufactured by Merck and sold under the trademark TEKTAMER 38™ (1,2 dibromo-2,4-dicyanobutane), will work in the composition of the invention.

Other acceptable preservatives include TROYSAN POLYPHASE P100™, a 3-Iodo-2-Propynyl Butyl Carbamate sold by Troy Chemical which is typically mixed with PVP K-30™, a 2-Pyrrolidinone, 1-Ethenyl-, Homopolymer (($C_6MgNO$)$_x$ solubilizer sold by ISP Technologies Inc. and M-PYROL™, a1-Methyl-Pyrrolidinone solubilizer sold by GAF Chemicals Corporation. Addition of preservatives to the undercolor and overcolor coloring compositions inhibits the growth of bacteria and fungi in water-based products.

Typically, a consumer using a non-porous surface such as a transparency may make marks using one or more colors on the transparency. These marks may be made using normal type input such as photocopying marks onto the transparency from a typewritten page. These marks may also be made using the various undercolor and overcolor coloring compositions of the invention.

The consumer may then select one or more markers containing various undercolor coloring compositions of the invention to highlight certain areas or important textual passages or graphical depictions contained on the transparency. The consumer may then select one or more markers containing various overcolor coloring compositions of the invention to further visually attract the viewer's attention. To create this visual attraction, the consumer may overwrite a portion or all of the previously made markings using the undercolor coloring composition of the invention thereby eliminating the color of the undercolor coloring composition as applied and leaving only the color of the overcolor coloring composition used to overwrite the undercolor coloring composition. Because of the surprisingly strong and immediate impact of the overcolor coloring composition used to overwrite the undercolor coloring composition, the overcolor marker appears to paint a color over the undercolor on the portions of the non-porous substrate on which it is applied.

Preferably, when the coloring compositions of the invention are used in the form of inks, the inks are placed in conventional markers. These markers utilize reservoirs for storing the ink and nibs such as bonded fiber or sintered plastic to dispense the ink. Typically, an ink reservoir contains a sponge like reservoir which holds the ink. The preferred reservoirs for undercolor coloring compostions of the invention are made of acetate, polyester or polypropylene. The preferred reservoirs for overcolor coloring compositions of the invention are made of polypropylene which more suitably resists attack by any reducing agent contained in the overcolor coloring composition.

In general, any suitable nib may be used in conjunction with the undercolor coloring compositions of the invention. However, where nylon or polyamide fibers are used, they should be checked for preferential dye absorption. Also, any compatible nib may be used in conjunction with the overcolor coloring compositions of the invention. Sintered polyethylene nibs are preferred and nylon and polyamide nibs should be checked for preferential dye absorption. In general, bonded polyester fiber nibs are not suitable for use with the overcolor coloring compositions of the invention. Various undercolor coloring compositions are placed in an undercolor set of markers, each containing an appropriate different color dye. Various overcolor coloring compositions of the invention are placed in a second group of markers, each of these compositions containing an appropriate different color colorant, either a dye or pigment. A marking kit or system is thus for meld which comprises both overcolor coloring compositions and undercolor coloring compositions.

EXAMPLES

Examples of marking systems of the present invention when formulated as an ink are as follows. Quantities are in percent by weight of the total composition.

Undercolor Coloring Composition Examples

| Undercolor Coloring Composition Examples | | |
|---|---|---|
| Component | Example 1 Violet % | Example 2 Blue % |
| Deionized Water | 83.7 | 91.7 |
| Propylene Glycol | 10.0 | 5.0 |
| Preservative | | |
| Germall II | 0.3 | — |
| Nuosept 95 | — | 0.3 |
| Dye | | |
| Acid Violet 19 | 4.0 | — |
| Acid Blue 93 | — | 2.0 |
| Film Forming Resin | | |
| AIRVOL 523 | 2.0 | — |
| POLYOX WSR-N-10 | — | 1.0 |

| Component | Example 3 Red % | Example 4 Violet % |
|---|---|---|
| Deionized Water | | |
| Propylene Glycol | 10.0 | 10.0 |
| Preservatives | 0.2 | 0.3 |
| Dye | | |
| Basic Red 49 | 4.0 | — |
| Basic Violet 10 | — | 2.0 |
| Film Forming Resin | | |
| POLYOX WSR-N-10 | 2.0 | — |
| PVP K-30 | — | 5.0 |

The inks of examples 1 through 4 had acceptable working properties. For examples 1 through 4, the pH ranged from 4.5 to 7.5 and the density ranged from 8.8 to 9.0 pounds per gallon. For examples 1 through 4, the viscosity ranged from 2.3 to 4.0 centipoise. The inks of examples 1 and 2 are especially suitable for overcolor elimination by an overcolor coloring composition containing a reducing agent. The inks of examples 3–4 are especially suitable for overcolor elimination by an overcolor coloring composition having a pH of about 10 or greater whether or not a reducing agent is present.

Overcolor Coloring Composition Examples

| Overcolor Coloring Composition Examples | | |
|---|---|---|
| Component | Example 5 Red % | Example 6 Blue % |
| DI Water | 78.0 | 84.5 |
| Propylene Glycol | 10.0 | 8.0 |
| $Na_2SO_3$ | 5.0 | 5.0 |
| NaOH (5N Soln)20% Solution | 1.0 | 0.5 |
| Dye | | |
| Acid Red 388 | 4.0 | — |
| Direct Blue 199 | — | 1.0 |
| Film Forming Resin | | |
| ACRYSOL WS-24 | 2.0 | — |
| POLYOX WSR-N-10 | — | 1.0 |

| Component | Example 7 Yellow % |
|---|---|
| DI Water | 78.0 |
| Propylene Glycol | 10.0 |
| $Na_2SO_3$ | 6.0 |
| NaOH (5N soln)20% Solution | 1.0 |
| Dye | |
| Pyranine 120 | 2.0 |
| Film Forming Resin | |
| ACRYSOOL WS-24 | 3.0 |

The inks of examples 5–7 had acceptable working properties. For examples 5–7, the pH ranged from 11.2 to 12.0 and the density ranged from 9.7 to 9.9 pounds per gallon. For examples 5–7, the viscosity ranged from 3.8 to 4.6 centipoise.

Two examples of overcolor coloring compositions in the form of an ink using a pigment dispersion as a colorant are as follows. Quantities are in percent by weight of the total composition.

Overcolor Coloring Composition Examples

| Overcolor Coloring Composition Examples | | |
|---|---|---|
| Component | Example 9 Red % | Example 10 Blue % |
| DI Water | 76.5 | 81.5 |
| Propylene Glycol | 8.0 | 5.0 |
| $Na_2SO_3$ | 5.0 | 5.0 |
| NaOH (5N Soln)20% Solution | 1.0 | 1.0 |
| Pigment | | |
| Hostafine Yellow HR | 7.5 | — |
| Hostafine Blue B2G | — | 6.0 |
| Film Forming Resin | 1.0 | 1.5 |
| POLYOX WSR-N-10 | | |

In using the various above described overcolor coloring compositions and undercolor coloring compositions, a consumer could place a transparency having indicia marked thereon on an overhead projector. If the consumer wishes to draw the attention of the viewer to a particular area of the indicia on the transparency, he could highlight a particular area with one or moire undercolors. To further draw the attention of the viewer to a very particular point in the highlighted violet area, the consumer may easily use the above-indicated overcolor coloring ink compositions, such as the red overcolor, to mark over an area previously marked upon using an undercolor coloring composition of the invention, without tainting any of the colors not marked upon and without tainting the nib of the overcolor marker.

In a further embodiment of the present invention, a variety of undercolor colors may be painted or otherwise applied on a non-porous substrate, such as a transparency, and the substrate, with these colors applied, could be supplied to a child in combination with the overcolor coloring composition in the form of an ink in a marker. An appropriate overcolor coloring composition coupled then be applied onto the substrate in areas where the child desired a change of color to produce the desired color change while at the same time his classmates can view the changes made by projecting the images on the substrate using a suitable overhead projector.

From the foregoing description and examples, it is apparent that the objects of the present invention have been achieved. While only certain embodiments have been set forth, alternative embodiments and various modifications will be apparent to those skilled in the art. These and other alternatives are considered equivalents and within the spirit and scope of the present invention. This application incorporates by reference those applications and patents referenced herein.

What is claimed is:

1. A multiple coloring composition system comprising:
   (a) an undercolor aqueous coloring composition comprising a first film forming resin and an undercolor dye whose coloring ability is destroyed in the presence of a pH of about 10 or greater; and
   (b) an overcolor aqueous coloring composition comprising a second film forming resin, a colorant capable of maintaining its characteristic color in the presence of a pH of about 10 or greater and an effective amount of a base sufficient to yield a pH of said overcolor aqueous coloring composition of about 10 or greater.

2. The multiple coloring composition system of claim 1, said base being present in an amount sufficient to yield a pH of said overcolor aqueous coloring composition of from about 10 to about 12.

3. The multiple coloring composition system of claim 2, said base added in an amount of from about 0.5% to about 8% by weight of said overcolor aqueous coloring composition.

4. The multiple coloring composition system of claim 1, wherein said undercolor dye of said undercolor coloring composition is selected from the group consisting of polymethine dyes, triphenylmethane dyes, and azo dyes which are unstable in the presence of a pH of about 10 or greater.

5. The multiple coloring composition system of claim 4, wherein said undercolor dye of said undercolor coloring composition is selected from the group consisting of Basic Blue 69, Basic Red 14, Basic Red 49, Acid Green 3, Acid Violet 19 and mixtures thereof.

6. The multiple coloring composition system of claim 1, wherein said colorant of said overcolor coloring composition is selected from the group consisting of pigments, xanthene dyes, pthalocyanine dyes, and azo dyes which are stable in the presence of a pH of about 10 or greater.

7. The multiple coloring composition system of claim 6, wherein said colorant of said overcolor coloring composition is selected form the group consisting of Acid Red 52, Acid Red 87, Acid Red 92, Acid Red 388, Food Red 14, Acid Green 26, Solvent Green 7, Direct Blue 199, pigments, and mixtures thereof.

8. The multiple coloring composition system of claim 1, wherein said overcolor aqueous coloring composition further comprises a reducing agent.

9. The multiple coloring composition system of claim 8, wherein said reducing agent is selected from the group consisting of hydrogen sulfide, sodium sulfite, sodium bisulphite and stannous chloride.

10. The multiple coloring composition system of claim 1, wherein said base is selected from the group consisting of ammonium hydroxide, sodium hydroxide and sodium carbonate.

11. The multiple coloring composition system of claim 1, wherein said undercolor and said overcolor coloring compositions further comprise a humectant.

12. The multiple coloring composition system of claim 1, wherein said undercolor and said overcolor coloring compositions further comprise a drying agent.

13. The multiple coloring composition system of claim 1, wherein said colorant of said overcolor aqueous coloring composition is present in an amount of from about 0.1% to about 5% by weight.

14. The multiple coloring composition system of claim 1, wherein said undercolor coloring composition further comprises a preservative.

15. The multiple coloring composition system of claim 1, wherein said overcolor coloring composition further comprises a preservative.

16. The multiple coloring composition system of claim 1, wherein said first film forming resin is selected from the group consisting of polyvinylpyrrolidone, polyvinyl alcohol, polyethylene glycol, alkali soluble acrylics, and modified starches.

17. The multiple coloring composition system of claim 1, wherein said second film forming resin is selected from the group consisting of polyvinylpyrrolidone, polyvinyl alcohol, polyethylene glycol, alkali soluble acrylics, and modified starches.

18. The multiple coloring composition system of claim 1, wherein said first and said second film forming resins are present in amount of from about 0.1% to about 5% by weight of said undercolor coloring composition and said overcolor coloring composition respectively.

19. A multiple coloring composition system comprising:
   (a) an undercolor aqueous coloring composition comprising a first film forming resin and an undercolor dye whose coloring ability is destroyed in the presence of a reducing agent; and
   (b) an overcolor aqueous coloring composition comprising a second film forming resin, a colorant capable of maintaining its characteristic color in the presence of a reducing agent and an effective amount of a reducing agent sufficient to destroy the coloring ability of said undercolor dye.

20. The multiple coloring composition system of claim 19, said reducing agent being present in an amount of from about 1% to about 20% by weight of said overcolor aqueous coloring composition.

21. The multiple coloring composition system of claim 20, said reducing agent is present in an amount of from about 5% to about 10% by weight of said overcolor aqueous coloring composition.

22. The multiple coloring composition system of claim 19, wherein said undercolor dye of said undercolor coloring composition is selected from the group consisting of polymethine dyes, triphenylmethane dyes, and azo dyes which are unstable in the presence of a reducing agent.

23. The multiple coloring composition system of claim 19, wherein said undercolor dye of said undercolor coloring composition is selected from the group consisting of Basic Blue 69, Basic Red 14, Basic Red 49, Acid Green 3, Acid Violet 19 and mixtures thereof.

24. The multiple coloring composition system of claim 19, wherein said colorant of said overcolor coloring composition is selected from the group consisting of pigments, xanthene dyes, pthalocyanine dyes, and azo dyes which are stable in the presence of a reducing agent.

25. The multiple coloring composition system of claim 19, wherein said colorant of said overcolor coloring composition is selected from the group consisting of Acid Red 52, Acid Red 87, Acid Red 92, Acid Red 388, Food Red 14, Acid Green 26, Solvent Green 7, Direct Blue 199, pigments, and mixtures thereof.

26. The multiple coloring composition system of claim 19, wherein said reducing agent is selected from the group consisting of hydrogen sulfide, sodium sulfite, sodium bisulphite and stannous chloride.

27. The multiple coloring composition system of claim 19, wherein said undercolor and said overcolor coloring compositions further comprise a humectant.

28. The multiple coloring composition system of claim 19, wherein said undercolor and said overcolor coloring compositions further comprise a drying agent.

29. The multiple coloring composition system of claim 19, wherein said colorant of said overcolor aqueous coloring composition is present in an amount of from about 0.1% to about 15% by weight.

30. The multiple coloring composition system of claim 19, wherein said undercolor coloring composition further comprises a preservative.

31. The multiple coloring composition system of claim 19, wherein said overcolor coloring composition further comprises a preservative.

32. The multiple coloring composition system of claim 19, wherein said first film forming resin is selected from the group consisting of polyvinylpyrrolidone, polyvinyl alcohol, polyethylene glycol, alkali soluble acrylics, and modified starches.

33. The multiple coloring composition system of claim 19, wherein said second film forming resin is selected from the group consisting of polyvinylpyrrolidone, polyvinyl alcohol, polyethylene glycol, alkali soluble acrylics, and modified starches.

34. The multiple coloring composition system of claim 19, wherein said first and said second film forming resins are present in amount of from about 0.1% to 5% by weight of said undercolor coloring composition and said overcolor coloring composition respectively.

35. An ink composition system comprising:

(a) an undercolor aqueous ink comprising from about 0.1% to about 5% by weight of said undercolor ink of a first film forming resin and from about 0.1% to about 15% by weight of said undercolor ink of an undercolor dye whose coloring ability is destroyed in the presence of a pH of about 10 or greater or in the presence of a reducing agent; and (b) an overcolor aqueous ink comprising from about 0.1% to about 5% by weight of said overcolor ink of a second film forming resin, from about 1% to about 20% by weight of said overcolor ink of a reducing agent; from about 0.1% to about 10% by weight of said overcolor ink of a base; and from about 0.1% to about 15% by weight of said overcolor ink of an overcolor colorant which maintains its characteristic color in the presence of a reducing agent and in the presence of a pH of about 10 or greater.

36. A color changing marking system comprising at least an undercolor marking instrument and an overcolor marking instrument, said undercolor marking instrument comprising a nib and an ink reservoir containing an undercolor ink composition comprising from about 0.1% to about 5% by weight of said undercolor ink of a first film forming resin and from about 0.1% to about 15% by weight of said undercolor ink of an undercolor dye whose coloring ability is destroyed in the presence of a pH of about 10 or greater or in the presence of a reducing agent; and said overcolor marking instrument comprising a nib and an ink reservoir containing an overcolor ink composition comprising from about 0.1% to about 5% by weight of said overcolor ink of a second film forming resin, from about 1% to about 20% by weight of said overcolor ink of a reducing agent; from about 0.1% to about 10% by weight of said overcolor ink of a base; and from about 0.1% to about 15% by weight of said overcolor ink of an overcolor colorant which maintains its characteristic color in the presence of a reducing agent and in the presence of a pH of about 10 or greater.

37. A multiple coloring composition system comprising:

(a) a first undercolor aqueous coloring composition comprising a first film forming resin and an undercolor dye whose coloring ability is destroyed in the presence of a pH of about 10 or greater;

(b) a second undercolor aqueous coloring composition comprising a second film forming resin and an undercolor dye whose coloring ability is destroyed in the presence of a reducing agent; and (c) an overcolor aqueous coloring composition comprising a third film forming resin, a colorant capable of maintaining its characteristic color in the presence of a pH of about 10 or greater and in the presence of a reducing agent, and an effective amount of a base sufficient to yield a pH of said overcolor aqueous coloring composition of about 10 or greater, and from about 1% to about 20% by weight of a reducing agent.

* * * * *

UNITED STATES PATENT AND TRADEMARK OFFICE
CERTIFICATE OF CORRECTION

PATENT NO. : 5,478,382
DATED : December 26, 1995
INVENTOR(S) : Richard E. Miller et al.

It is certified that error appears in the above-indentified patent and that said Letters Patent is hereby corrected as shown below:

On the title page,

In the section "References Cited", "3,700,603 6/1972" should read --3,700,603 6/1969--

Col. 1, line 49, "holding" should read --bolding--

Col. 12, line 12, "KATHON PFM®" should read --KATHON PFM™--

Col. 12, line 59, "compostions" should read --compositions--

Col. 15, line 7, "moire" should read --more--

Col. 16, line 28, "5%" should read --15%--

Signed and Sealed this

Thirtieth Day of July, 1996

Attest:

BRUCE LEHMAN

Attesting Officer     Commissioner of Patents and Trademarks